A. H. ECKARDT.
ATTACHMENT FOR MOWING MACHINES.
APPLICATION FILED MAY 12, 1911.
1,026,738.
Patented May 21, 1912.
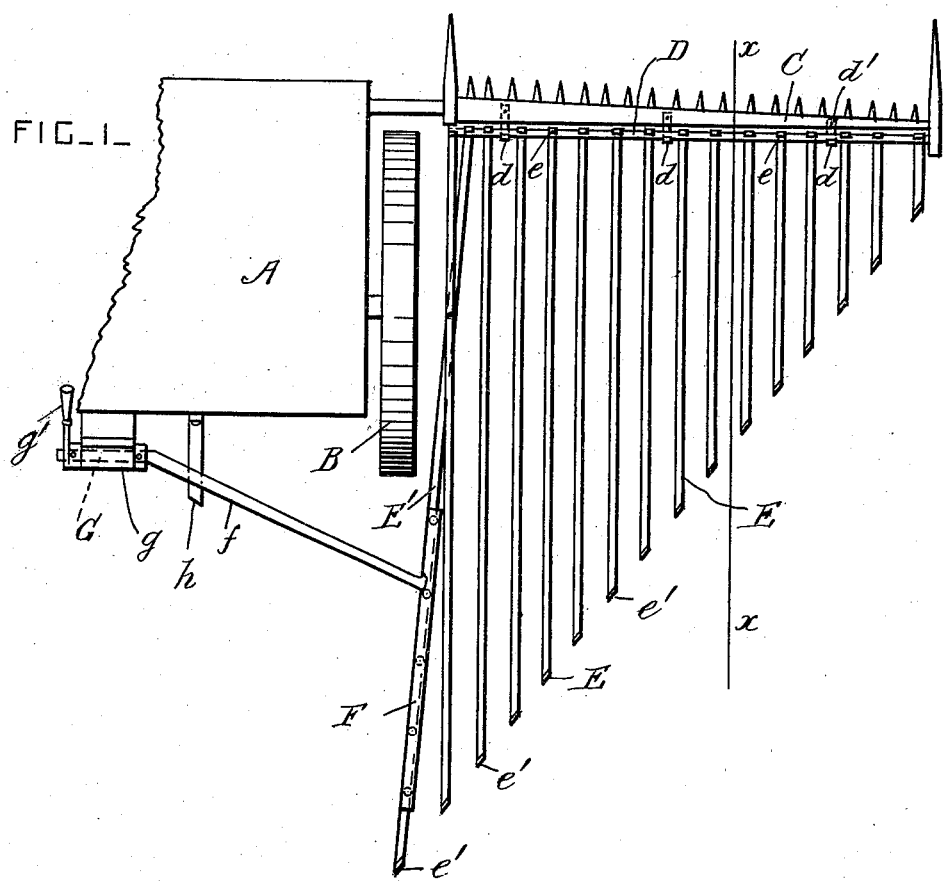
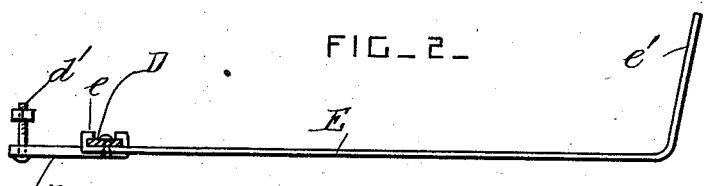
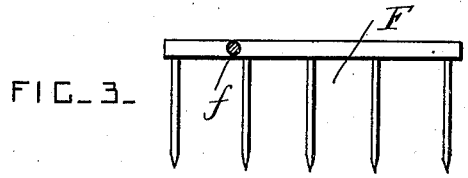

UNITED STATES PATENT OFFICE.

AUGUST H. ECKARDT, OF ST. PAUL, MINNESOTA.

ATTACHMENT FOR MOWING-MACHINES.

1,026,738.  Specification of Letters Patent.  Patented May 21, 1912.

Application filed May 12, 1911. Serial No. 626,802.

*To all whom it may concern:*

Be it known that I, AUGUST H. ECKARDT, a citizen of the United States, residing at St. Paul, in the county of Ramsey and State of Minnesota, have invented certain new and useful Improvements in Attachments for Mowing-Machines; and I do hereby declare the following to be a full, clear, and exact description of the invention, such as will enable others skilled in the art to which it appertains to make and use the same.

This invention relates to attachments to mowing machines for delivering the cut crop at intervals and to one side of the swath cut by the machine; and it consists in the novel construction and combination of the parts hereinafter fully described and claimed.

In the drawings, Figure 1 is a plan view of portions of a mowing machine showing attachments connected to it according to this invention. Fig. 2 is a longitudinal section through the attachments, taken on the line $x$—$x$ in Fig. 1. Fig. 3 is a side view of the gate.

A represents a portion of the framing of a mowing machine of any approved construction provided with ground wheels B, and having a cutter-bar C which projects laterally at one side of the machine.

D is a crossbar attached to the cutter-bar by means of hook-shaped straps $d$. These straps are bolted to the cutter-bar at one end by bolts $d'$, and the guard bolts of the cutter-bar may be utilized for this purpose, if desired. The other and hooked ends of the straps are riveted to the crossbar D, and as many straps may be used as may be desirable.

A receiver for the cut crop is provided and it is formed of a series of parallel bars E of graduated lengths. The bars nearest the mowing machine are longer than those at the other side of the receiver so that the receiver is substantially triangular in outline. The longest bar of all E′ is not arranged parallel to the bars E, but crosses the next adjacent bar E at a very acute angle and is riveted to the bar E at this point.

The bar E′ is secured to the crossbar between two of the bars E at one end, and has its free end arranged at about the same distance from the adjacent bar E as the said bars E are apart from each other. All the bars E and E′ are provided with hook-shaped end portions $e$ which engage with and are riveted to the crossbar.

The free end portions of the bars E and E′ have upwardly curved end portions $e'$ to prevent the cut crop from sliding longitudinally off them and to guide it to the side of the receiver next to the mowing machine. The free end portions of the bars E and E′ rest on the ground as the machine is drawn along.

In order that the cut crop may be discharged from the receiver at intervals instead of continuously, a gate F is arranged over the rear part of the bar E′ where the crop piles up. This gate is formed of prongs like the head of a rake and it is secured to one arm $f$ of a crankshaft G which is journaled in a bearing or bearings $g$ on the frame of the machine. The arm $f$ is inclined rearwardly of the crankshaft G and the gate is secured to its free end. An operating lever or arm $g'$ is secured to the other end of the crankshaft and can be depressed at will, by hand or by foot, so as to raise the gate and permit the cut material to slide off the receiver. The gate may rest on the bar E′, or a stop $h$ may be provided on the frame for the arm $f$ to rest on when the gate is not raised. When the arm $g'$ is released the gate descends to its normal position by gravity, or it may be pushed down forcibly.

The cut crop is discharged from the receiver onto the ground behind the frame of the machine, and to one side of the swath directly behind the cutter-bar, so that a path is left free for the passage of the machine and the horses which draw it along when the next swath is cut.

What I claim is:

The combination, with a mowing machine provided with a wheeled frame and a cutter-bar, and a receiver for the cut crop secured to the rear of the cutter-bar; of a bearing secured to the said frame, a shaft journaled in the said bearing and provided at one end with an arm arranged at an angle to its axis and projecting rearwardly and laterally toward the said receiver, a gate having its top member secured to the free end of the said arm and provided with downwardly projecting teeth which normally close the outlet from the receiver, an operating lever secured to the other end of the said shaft on the other side of the bearing from the receiver, and a stop or rest, for supporting the said gate, secured to the said frame between the said bearing and receiver and projecting rearwardly under the said inclined arm.

In testimony whereof I have affixed my signature in the presence of two witnesses.

AUGUST H. ECKARDT.

Witnesses:
W. O. L. BROWN,
R. J. MCPHAIL.

Copies of this patent may be obtained for five cents each, by addressing the "Commissioner of Patents, Washington, D. C."